United States Patent [19]
Urquhart et al.

[11] Patent Number: 6,151,132
[45] Date of Patent: *Nov. 21, 2000

[54] METHOD OF IMPROVING ASSISTANCE TO AN OPERATOR DURING JAM RECOVERY IN AN ITEM PROCESSING SYSTEM

[75] Inventors: Brian J. Urquhart, Heidelberg; Brian S. Bullock, St. George; Lianne C. Franklin, Waterloo, all of Canada

[73] Assignee: NCR Corporation, Dayton, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/950,232

[22] Filed: Oct. 14, 1997

[51] Int. Cl.$^7$ .............................. B41B 15/00; B41J 15/00; G06F 15/00
[52] U.S. Cl. .............................................. 358/1.14; 705/35
[58] Field of Search .............................. 209/3.1–3.3, 509, 209/546–9, 583; 395/113–117; 399/18, 373; 271/3.13; 235/379; 382/137–140; 705/30–45

[56] References Cited

U.S. PATENT DOCUMENTS

| | | | |
|---|---|---|---|
| 4,786,041 | 11/1988 | Acquaviva et al. | 271/3.13 |
| 5,040,227 | 8/1991 | Lyke et al. | 382/138 |
| 5,210,823 | 5/1993 | Moroi | 395/101 |
| 5,517,295 | 5/1996 | Kaneko et al. | 399/373 |
| 5,543,893 | 8/1996 | Sheldon et al. | 399/18 |
| 5,745,661 | 4/1998 | Koh et al. | 395/113 |
| 5,768,483 | 6/1998 | Maniwa et al. | 395/114 |
| 5,842,577 | 12/1998 | Stevens et al. | 209/3.3 |
| 5,874,717 | 2/1999 | Kern et al. | 235/379 |

*Primary Examiner*—Joseph Mancuso
*Assistant Examiner*—F. E. Cooperrider
*Attorney, Agent, or Firm*—Michael Chan

[57] ABSTRACT

Improved assistance is provided to an operator during jam recovery of an image-based financial document processing system used to process transaction items including debit and credit items. Information associated with a first group of transaction items is displayed after a jam condition has occurred to enable the operator to retrieve at least some of the transaction items of the first group of transaction items. Information associated with a second group of transaction items is displayed as the operator feeds transaction items from the second group of transaction items back into the system to reprocess these transaction items. The displayed information associated with the first group of transaction items and the displayed information associated with the second group of transaction items are compared to determine if a transaction item from the first group and a transaction item from the second group match. When a match is found, a determination is made as to which operations of the system, if any, have yet to be completed for the particular matched transaction item. Operations which have yet to be completed for the particular matched transaction item are selectively performed. When a match is unable to be found, an operator is able to either force a match between a transaction item from the first group of transaction items and a transaction item from the second group of transaction items, or remove a transaction item from one of the first and second groups of transaction items.

4 Claims, 5 Drawing Sheets

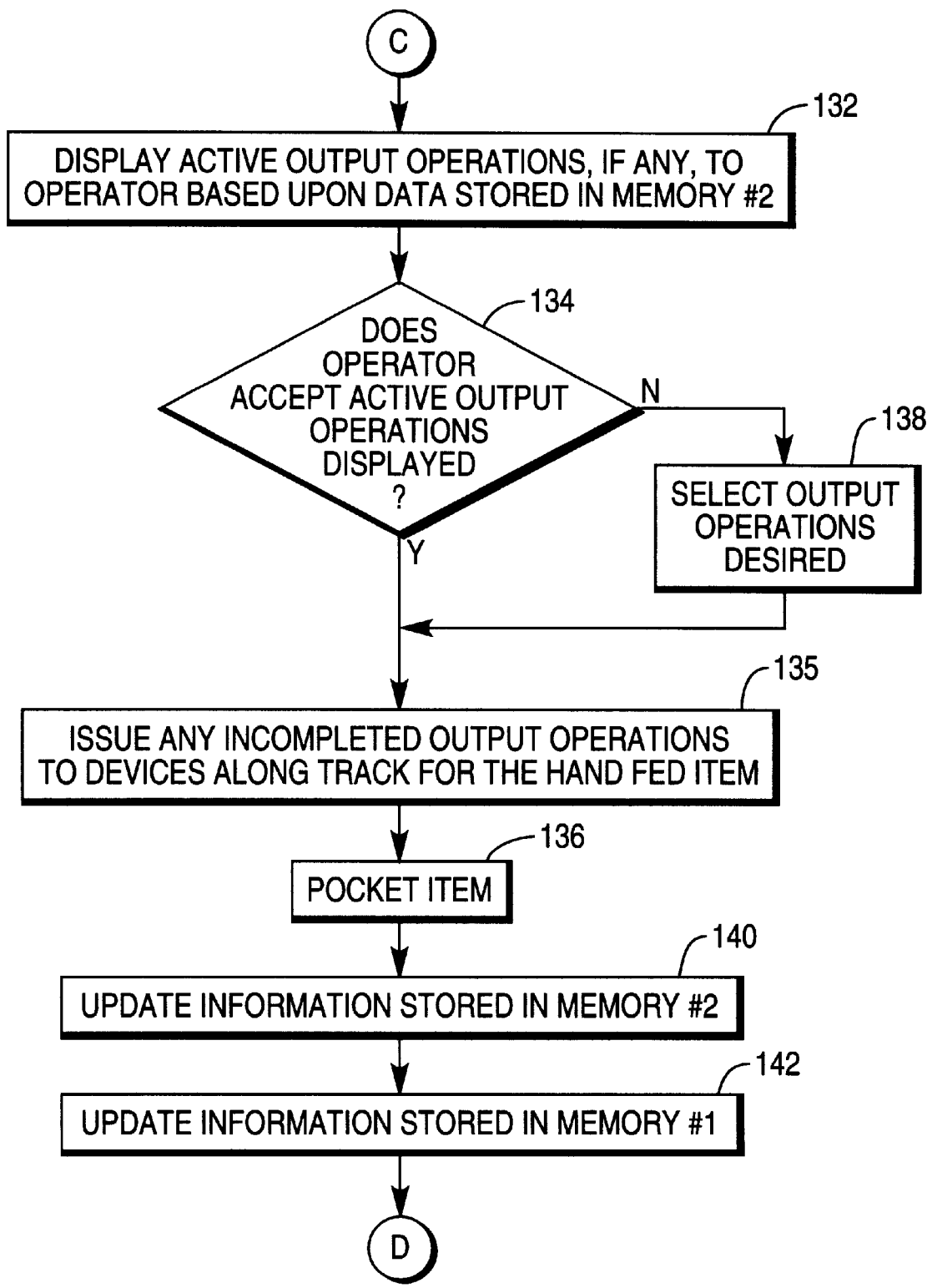

METHOD OF IMPROVING ASSISTANCE TO AN OPERATOR DURING JAM RECOVERY IN AN ITEM PROCESSING SYSTEM

BACKGROUND OF THE INVENTION

The present invention relates to recovering from a jam condition in an item processing system, and is particularly directed to improving assistance to an operator to recover from a jam condition in an image-based financial document processing system such as an image-based check processing system.

A typical image-based check processing system includes a number of different types of workstations. The different types of workstations may include a document preparation workstation, an image capture workstation, a recognition workstation, a keying and balancing workstation, an encoding workstation, and a printing workstation. An image capture workstation creates units of work and submits the created work to a workflow manager in a known way. Each of the downstream workstations polls the workflow manager in a known manner for work to perform, and may also create units of work which is submitted back to the workflow manager. Image data and codeline data are processed at the different workstations.

From time to time, a jam condition may occur in a transport track of the image capture workstation or a transport track of the encoding workstation. Typically, when a jam condition occurs in a track, any check(s) in the track that have not been completely processed are manually located by an operator and removed from the track. To avoid problems further downstream, such as an out-of-balance condition, the operator must ensure that all checks which have not been completely processed are removed from the track. The removed checks must then be reprocessed.

The efforts required of the operator to first locate the checks which need to be reprocessed and then to determine how each check is to be reprocessed are manually performed and, therefore, are prone to error. This error-prone process may be relatively time-consuming. Typically, a MICR or OCR codeline, a sequence number, and a destination pocket associated with each incompletely processed check are listed for the operator. The operator must find each incompletely processed check and compare the codeline and sequence number, which may or may not be endorsed on each check, to the codelines and the sequence number listed for the operator. The operator must also examine each check to be reprocessed to determine if encoding and/or endorsing should be turned ON or OFF to prevent over-encoding and/or over-endorsing of the check during reprocessing.

The operator must also be careful to not reprocess checks which do not require reprocessing. If either a check which needs to be reprocessed is reprocessed incorrectly, or a check which does not require reprocessing is processed by mistake, downstream steps of balancing and reconciliation, for example, are made more difficult. The cost of operating the check processing system is, therefore, usually relatively high.

SUMMARY OF THE INVENTION

In accordance with one aspect of the present invention, a method of improving assistance to an operator during jam recovery of an image-based financial document processing system used to process transaction items including debit and credit items, comprises the steps of (a) displaying information associated with a first group of transaction items after a jam condition has occurred to enable the operator to retrieve at least some of the transaction items of the first group of transaction items, (b) displaying information associated with a second group of transaction items as the operator feeds transaction items from the second group of transaction items back into the system to reprocess these transaction items, (c) comparing the displayed information of step (b) with the displayed information of step (a) to determine if a transaction item from the first group and a transaction item from the second group match, and (d) after a match is found in step (c), determining which operations of the system, if any, have yet to be completed for the particular matched transaction item.

Preferably, an image associated with each transaction item of the first group and an image associated with each transaction item of the second group are displayed. A MICR codeline associated with each transaction item of the first group and a MICR codeline associated with each transaction item of the second group are also displayed. After a match is unable to be found in step (d), an operator is able to either force a match between a transaction item from the first group of transaction items and a transaction item from the second group of transaction items, or remove a transaction item from one of the first and second groups of transaction items. Operations which have yet to be completed for the particular matched transaction item identified in step (d) are selectively performed.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIGS. 2A–2D are flowcharts depicting processes carried out in accordance with the present invention.

DETAILS OF THE INVENTION

Figure 1:
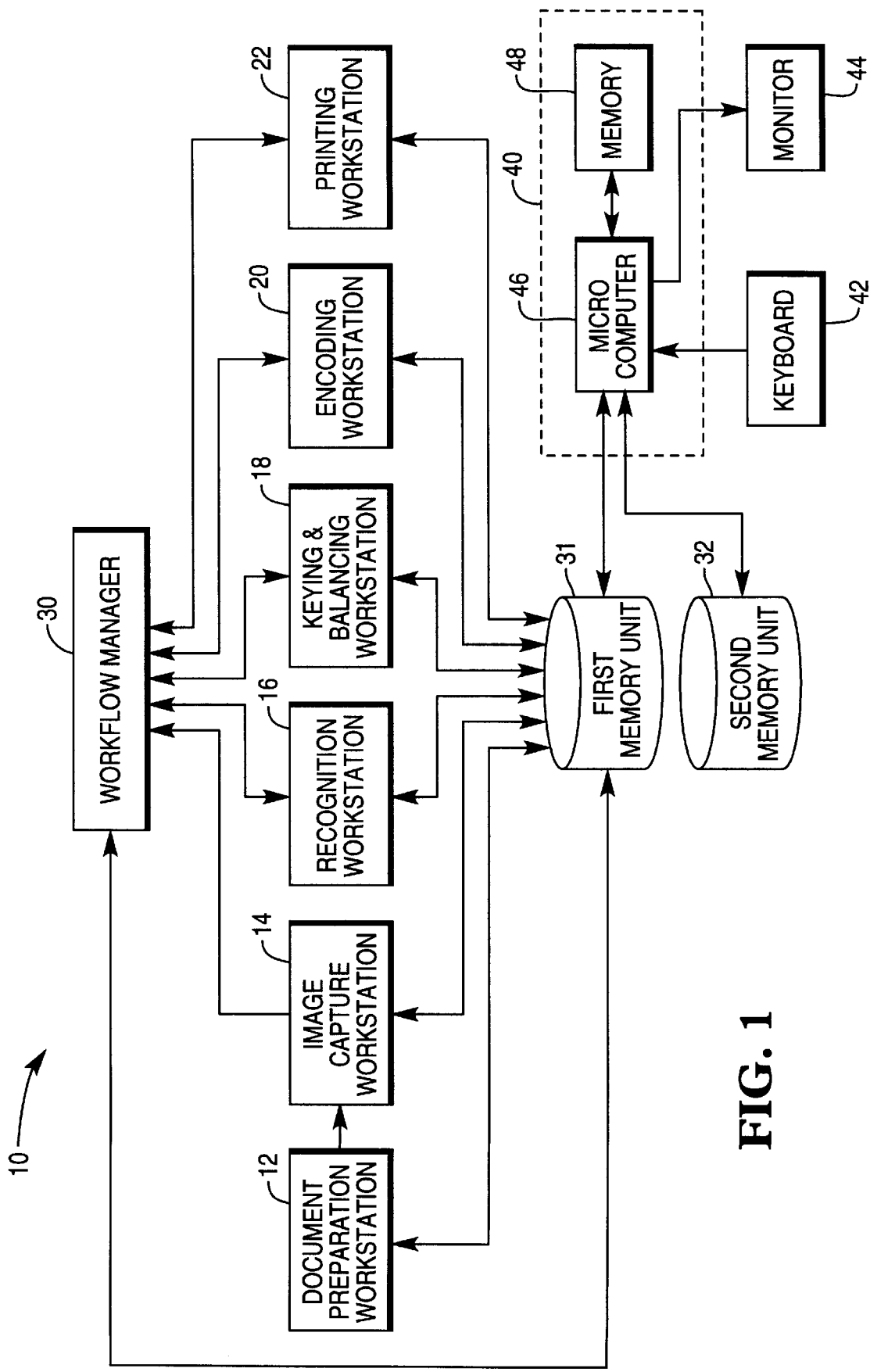
FIG. 1 is a schematic block representation of an image-based check processing system embodying the present invention.
Figure 2A:
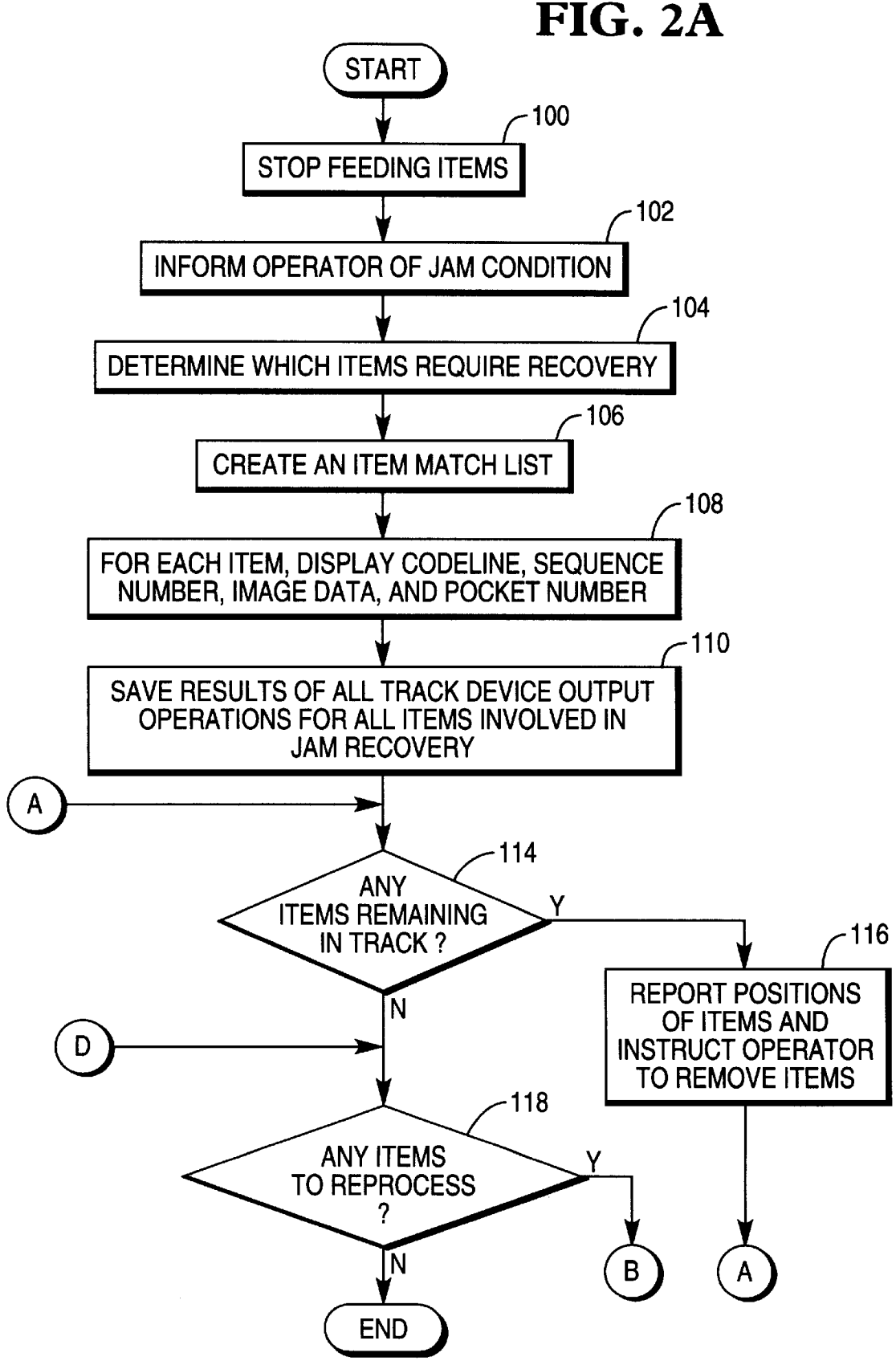
Figure 2B:
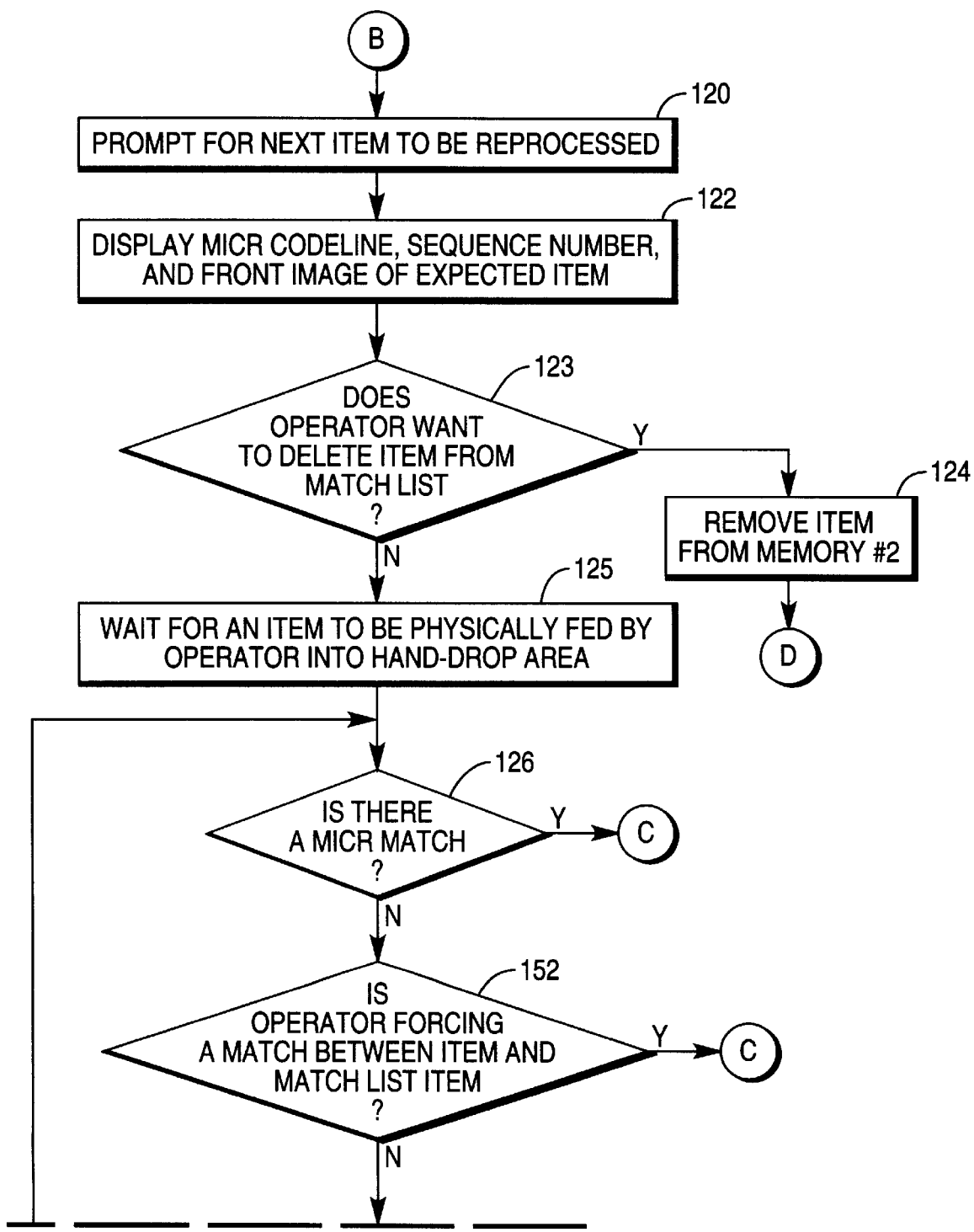
Figure 2C:
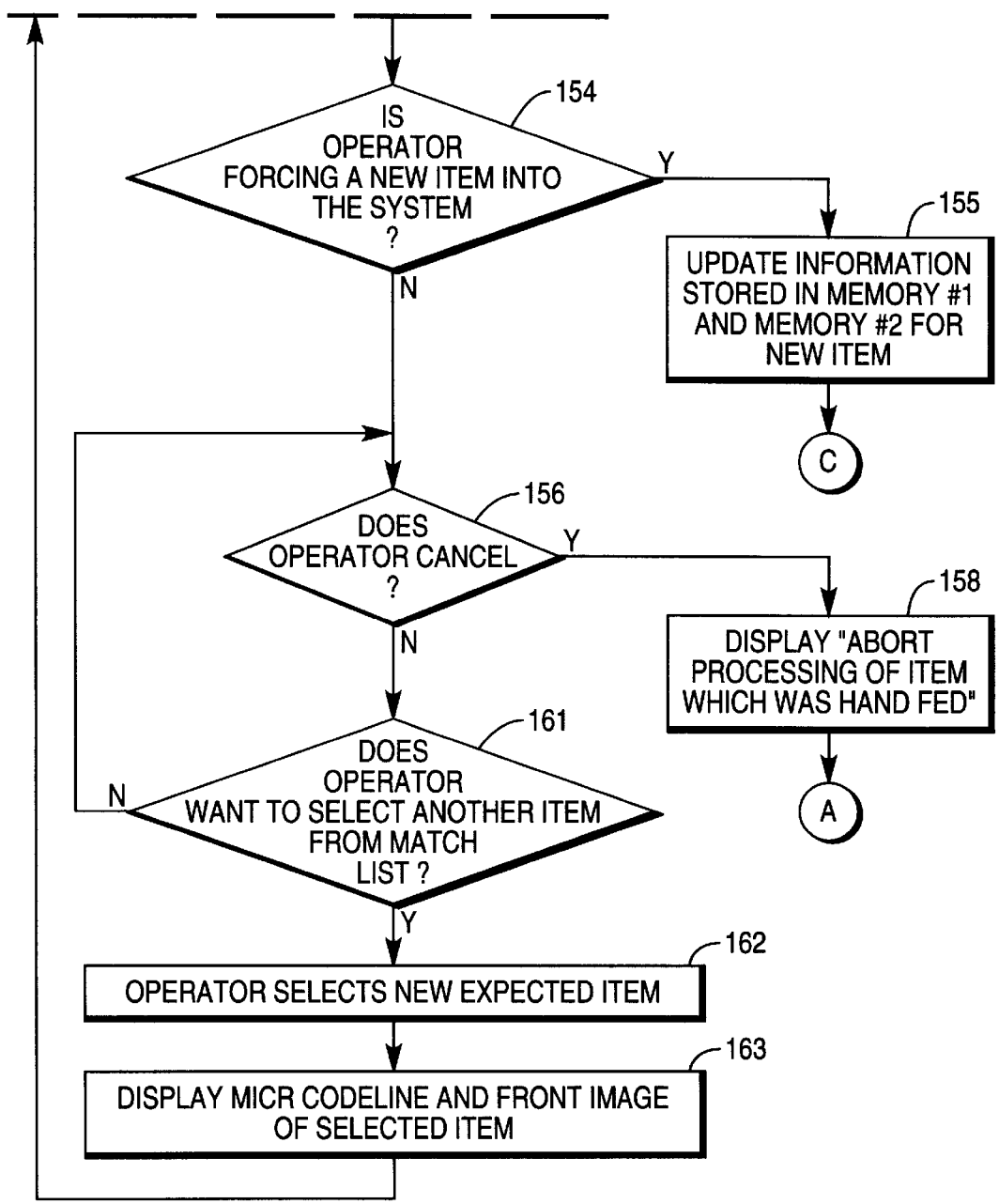

The present invention is directed to a method of improving assistance to an operator during jam recovery in an item processing system used to process transaction items including debit and credit items. The specific use of the method described in the present application may vary. By way of example, an item processing system in the form of an image-based check processing system 10 embodying the present invention is illustrated in FIG. 1. The image-based check processing system 10 comprises different types of workstations including a document preparation workstation 12, an image capture workstation 14, a recognition workstation 16, a keying and balancing workstation 18, an encoding workstation 20, and a printing workstation 22. The workstation 14 creates units of work and submits the created work to a workflow manager 30 in a known way. Each of the workstations 16, 18, 20, 22 polls the workflow manager 30 in a known manner for work to perform, and may also create units of work which is submitted back to the workflow manager 30.

At the document preparation workstation 12, transaction items including a number of debit items and a number of credit items associated with each transaction are prepared for further processing. Preparation of the debit and credit items may include removal of paper clips, staples, and the like, and stacking of the items in a particular order and/or direction in suitable trays. The trays containing the stacked items are then manually carted to the image capture workstation 14.

At the image capture workstation 14, the stacked items in the trays are manually removed from the trays and placed onto an image lift transport (not shown) of the image capture workstation 14. The transaction items on the image lift transport are moved along a transport track in front of a front image lift camera and in front of a rear image lift camera (both not shown). The image lift camera optically scans each item as the item moves along the transport track in front of the cameras to produce front and rear electronic images of the item. The electronic images of the item are then stored in a first memory unit 31 along with a unique sequence number.

Also, if the item being processed contains a MICR codeline, the MICR codeline is read as the item passes by a MICR reader (not shown). Alternatively, if the item being processed contains an OCR codeline, the OCR codeline is read as the item passes by an OCR reader. For simplicity, it is assumed that the item being processed contains a MICR codeline. The MICR codeline is associated with the front and rear electronic images and is also stored in the first memory unit 31. Suitable endorsement is printed onto the item as the item passes an endorser module (not shown). An endorsement status associated with the item is then stored in the first memory unit 31 along with the other information associated with the item. Also, the item is microfilmed as the item passes a microfilmer (not shown). A microfilm status associated with the item is stored in the first memory unit 31.

After the images of an item are lifted by the image lift cameras and the electronic images, the sequence number, and the MICR codeline are captured, and the item is endorsed and microfilmed, the item is sorted into an appropriate sorter pocket (not shown) of the image capture workstation 14. Preferably, the image capture workstation 14 includes the Model 7780 Item Processing System, manufactured by NCR Corporation, located in Dayton, Ohio. The sorted items in each of the sorter pockets are stacked in a respective tray. The trays are then manually carted to the encoder workstation 20. The trays of items are encoded in a known manner at the encoder workstation 20 while the electronic images, the sequence numbers, and the MICR codelines of the items which were earlier captured and stored in the first memory unit 31 at the image capture workstation 14 are processed by the recognition workstation 16 and the keying and balancing workstation 18 in the manner described hereinbelow. An encoder status associated with the item is stored in the first memory unit 31.

At the recognition workstation 16, the electronic images of the items stored in the first memory unit 31 after being processed at the image capture workstation 14 are processed using known recognition techniques to determine the "amount" associated with each item. The amount of each item is then associated with the corresponding electronic images and the MICR codeline of the item and stored in the first memory unit 31. A one-to-one correspondence is thereby established between the electronic images, the sequence number, the MICR codeline, the endorsement status, the encoder status, and the microfilm status of each item and the amount associated with that particular item. Accordingly, a database containing electronic images, the sequence number, the MICR codeline, the endorsement status, the encoder status, the microfilm status, and the amount associated with each item is thereby created and stored in the first memory unit 31.

It should be noted that some amounts will not be recognizable to the recognition workstation 16. Also, some amounts recognized at the recognition workstation 16 may have a low confidence level associated therewith. These items are identified and then processed further at the keying and balancing workstation 18.

A processor unit 40 is associated with the image capture workstation 14. Another processor unit (not shown) similar to the processor unit 40 is associated with the encoder workstation 20. Both processor units operate in the same way. For convenience, only the processor unit 40 associated with the image capture workstation 14 is described in detail. The processor unit 40 receives input signals from a keyboard 42 and provides output signals to the display screen of a monitor 44 in response to the input signals. The processor unit 40 includes a microcomputer 46 and a memory 48 which communicates with the microcomputer 46. The microcomputer 46 receives input signals from the keyboard 42 and processes these input signals in accordance with a program stored in the memory 48. Suitable microcomputers and memories are readily available in the marketplace. Their structure and operation are well known and, therefore, will not be described.

The microcomputer 46 communicates with the first memory unit 31 and a second memory unit 32. As previously described, the first memory unit 31 is an item data and image memory which stores MICR codelines, sequence numbers, endorsement status, microfilm status, encoder status, and image data associated with transaction items. The second memory unit 32 is an item control block memory which stores data relating to certain items during a jam recovery process to be described later. More specifically, the data stored in the second memory unit 32 represents the current state of output operations (i.e., all completed and incomplete output operations) for each item involved in the jam condition along the track.

When a jam condition occurs along a transport track, a jam recovery process in accordance with the present invention is initiated. The transport track may be associated with either the image capture workstation 14 or the encoding workstation 20. FIGS. 2A–2D are flowcharts which depict the jam recovery process which is initiated immediately after the jam condition occurs. This jam recovery process is described in detail hereinbelow with reference to FIGS. 2A–2D.

In step 100, the image capture workstation 14 provides the signals required to stop feeding of all checks along the transport track in response to sensors (not shown) positioned along the track sensing the occurrence of a jam condition along the transport track. In step 102, the operator is informed of the occurrence of the jam condition via an indicator device (not shown), for example. The process then proceeds to step 104 in which an application program stored in the memory 48 of the processor unit 40 is invoked to determine which items along the transport track need to be recovered. The application program determines which items need to be recovered by querying the database of MICR codelines, sequence numbers, endorsement status, microfilm status, encoder status, and image data stored in the first memory unit 31. Typically, all items fed into the transport track after the last known completed item need to be removed and reprocessed. This determination is conventional and well known. Therefore, this application program will not be described in detail.

In step 106, an item match list is created and stored in the first memory unit 31. The item match list is created by taking all items which have been introduced into the transport track but have not been fully processed. Then, as shown in step 108, the MICR codeline, the sequence number, the image data, and the pocket number of each item from the item match list are displayed on the display screen of the monitor 44 to allow the operator to view this information. Using the information displayed on the monitor 44, the operator acknowledges retrieval of all items required for jam recovery. The operator acknowledges retrieval of theses items by hitting an appropriate key on the keyboard 42 or clicking an appropriate screen button on the monitor 44. The results of the items identified in step 106 are saved in the second memory unit 32, as shown in step 110. These results include, for each item, all output operations along the transport track which have been performed and all output operations along the transport track which have yet to be performed.

The process then proceeds to step 114 in which a determination is made as to whether any items which need to be recovered are remaining in the transport track. This determination is made by the processing unit 40 monitoring a number of sensors (not shown) disposed along the transport track. If the determination in step 114 is affirmative, the process proceeds to step 116 in which the position of each item which needs to be recovered is displayed on the monitor 44 to instruct the operator as to where to locate the respective item to be removed from the transport track. The process then returns from step 116 to step 114. However, if the determination in step 114 is negative, the process proceeds to step 118 in which a determination is made as to whether there is any item to be reprocessed. This determination is made by retrieving and processing data stored in the second memory unit 32. If the determination in step 118 is negative, the jam recovery process ends which indicates that no more items require recovery. Otherwise, the process proceeds to step 120.

In step 120, the operator is prompted for the next item to be reprocessed. As shown in step 122, the MICR codeline, the sequence number, and image data of the front of this item are displayed on the monitor 44 and presented to the operator. In step 123, the operator is prompted as to whether it is desired to remove the item displayed from the match list. It is desirable to remove an adding machine tape, for example. If the determination in step 123 is affirmative, the item is removed from the match list in the second memory unit 32 as shown in step 124. The process then returns to step 118.

However, if the determination in step 123 is negative, the process proceeds to step 125. The process then waits for the operator to feed this item into a hand-drop area of the item processing system 10, as shown in step 125. Typically, the hand-drop area is located at the item entry end of the transport track. The Model 7780 Item Processing System includes a commercially available hand-drop mechanism. The structure and operation of the hand-drop mechanism are known and, therefore, will not be described in detail. After the item is fed into the hand-drop area, a determination is made in step 126 as to whether this item is the item which is being expected to be fed into the hand-drop area. This determination is made by comparing the MICR codeline of the fed item of step 125 and the MICR codeline displayed on the display screen of the monitor 44 of step 122.

If the determination in step 126 is affirmative, the process proceeds to step 132. The active output operations are displayed on the monitor 44 for viewing by the operator, as shown in step 132. It should be noted that the active output operations are based upon certain data stored in the second memory unit 32.

A determination is then made in step 134 as to whether the operator accepts the proposed active output operations to be performed on the item to be reprocessed, as shown on the monitor 44 in step 132. If the operator accepts, the process proceeds to step 135. In step 135, signals for any incomplete output operations for the particular item are sent to respective devices along the transport track to activate these devices to perform their respective operations on the item. The process then proceeds to step 136 in which the item is processed accordingly and pocketed. If the determination in step 134 is negative, the process proceeds to step 138 in which the operator can override and select specific output operations desired before the item is processed accordingly and pocketed. The information in the first memory unit 31 and the second memory unit 32 are then updated, as shown in steps 140, 142 before the process returns to step 118 to process the next item (if any) to be reprocessed.

However, if the determination in step 126 is negative, the process proceeds to step 152. A determination is then made in step 152 as to whether the operator is forcing a match between the item which may have been physically adjusted and the expected item displayed on the monitor 44 in step 122. This physical adjustment of the item may include correcting the orientation of the item or unfolding a dog ear which has been formed on the item. If the determination in step 152 is affirmative, the process proceeds to step 132 and processes the item in the manner as just described hereinabove. If the determination in step 152 is negative, the process proceeds to step 154 in which a determination is made as to whether the operator is forcing a new item into the item processing system 10. The new item introduced may include an unknown item which was piggybacked onto a known recoverable item introduced earlier into the transport.

If the determination in step 154 is affirmative, the process then proceeds to step 155 where the new item is added to the information stored in the first memory unit 31 and the second memory unit 32. The process proceeds to step 132 and processes the item in the manner as just described hereinabove. If the determination in step 154 is negative, the process proceeds to step 156. In step 156, a determination is made as to whether the operator has canceled any further processing of the item which was hand-dropped in step 125. As an example, the operator may wish to cancel any further processing of the item when the operator recognizes that the item has a dog ear or is incorrectly oriented. If the determination in step 156 is affirmative, the process proceeds to step 158 in which a message indicating that processing of the present item has been aborted. The process then returns to step 114 to ensure the item has been removed from the transport track. The process then proceeds to reprocess the same item which has just been canceled. Otherwise, if the determination in step 156 is negative, the process proceeds to step 161 to wait for the operator to select an item from the item match list to be matched to the item which was hand-dropped in step 125. As an example, the operator may wish to select another item from the match list when the operator recognizes that an incorrect item has been hand-dropped in step 125.

If the operator does not select another item from the match list in step 161, the process proceeds back to step 156 in which a determination is made as to whether the operator desires to cancel processing the present item. If the operator selects another item from the match list in step 161, the process proceeds to step 162 in which the operator selects a new expected item. As shown in step 163, the MICR codeline and the front image of the selected item are displayed for the operator to view. The process then returns to step 126 to repeat the above-described matching procedure.

A number of advantages result by providing a method of improving assistance to an operator during jam recovery. One advantage is that the operator is led through jam recovery using visual images of the items to be reprocessed. Another advantage is that items which need to be reprocessed are matched and then selectively reprocessed based upon the match. The operator is also shown information indicating which devices downstream of the transport track are turned ON and OFF during reprocessing of that particular check. Accordingly, the need for the operator to manually turn devices ON and OFF for each check to be reprocessed is reduced which, in turn, reduces the chance of over-encoding and/or over-endorsing, for example. Moreover, the chance of the operator forgetting to turn a device downstream back on is reduced.

Although the foregoing describes a jam recovery process in the image capture workstation 14, it is contemplated that the same jam recovery process may be used in the encoding workstation 20.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of operating an image-based financial document processing system to process transaction items during jam recovery, the method comprising the steps of:
   (a) identifying a group of transaction items which need to be fed back into the system to reprocess these transaction items;
   (b) displaying codeline information associated with the group of transaction items identified in step (a) to indicate to an operator a sequence in which the transaction items need to be fed back into the system;
   (c) receiving a transaction item which has been manually fed from an operator;
   (d) using a computer to compare codeline information from the manually-fed transaction item of step (c) with the displayed codeline information of step (b) to determine if the manually-fed transaction item of step (c) has been fed in correct sequence by the operator during jam recovery; and
   (e) allowing an operator to force a match between the manually-fed transaction item and a transaction item from the displayed group of transaction items when a determination is made in step (d) that the manually-fed transaction item has been fed in incorrect sequence by the operator during jam recovery.

2. A method according to claim 1, further comprising the step of:
   (f) allowing an operator to remove a transaction item from the displayed group of transaction items during jam recovery.

3. A method according to claim 1, further comprising the step of:
   (f) allowing an operator to insert a new item into the displayed group of transaction items during jam recovery.

4. An image-based financial document processing system for processing transaction items during jam recovery, the system comprising:
   means for identifying a group of transaction items which need to be fed back into the system to reprocess these transaction items;
   means for displaying codeline information associated with the group of transaction items identified to indicate to an operator a sequence in which the transaction items need to be fed back into the system;
   means for receiving a transaction item which has been manually fed from an operator;
   a computer for comparing codeline information from the manually-fed transaction item with the displayed codeline information to determine if the manually-fed transaction item has been fed in correct sequence by the operator during jam recovery; and
   means for allowing an operator to force a match between the manually-fed transaction item and a transaction item from the displayed group of transaction items when a determination is made that the manually-fed transaction item has been fed in incorrect sequence by the operator during jam recovery.

* * * * *